United States Patent
Okmianski et al.

(10) Patent No.: US 7,505,464 B2
(45) Date of Patent: Mar. 17, 2009

(54) METHOD OF IDENTIFYING A HOME GATEWAY USING NETWORK TRAFFIC SNIFFING AND APPARATUS EMPLOYING THE SAME

(75) Inventors: Anton Okmianski, Lincoln, MA (US); Mickael Graham, Lincoln, MA (US); Joshua B. Littlefield, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 563 days.

(21) Appl. No.: 11/215,928

(22) Filed: Aug. 30, 2005

(65) Prior Publication Data

US 2007/0058621 A1 Mar. 15, 2007

(51) Int. Cl.
 *H04L 12/28* (2006.01)
 *H04J 3/24* (2006.01)
(52) U.S. Cl. ...................................... 370/392; 370/475
(58) Field of Classification Search ................. 370/389, 370/392, 400, 401, 475
See application file for complete search history.

(56) References Cited

U.S. PATENT DOCUMENTS

| | | | |
|---|---|---|---|
| 5,812,819 A * | 9/1998 | Rodwin et al. ................ | 703/23 |
| 6,023,464 A | 2/2000 | Woundy | |
| 6,836,481 B1 * | 12/2004 | Hotta .......................... | 370/392 |
| 6,839,323 B1 * | 1/2005 | Foti ............................ | 370/235 |
| 7,143,435 B1 * | 11/2006 | Droms et al. .................. | 726/3 |
| 7,362,747 B2 * | 4/2008 | Charlot ....................... | 370/352 |
| 2002/0176427 A1 * | 11/2002 | Noda et al. ................. | 370/401 |

* cited by examiner

*Primary Examiner*—Wing F. Chan
*Assistant Examiner*—Hong Sol Cho
(74) *Attorney, Agent, or Firm*—MacPherson Kwok Chen & Heid, LLP.; Tom Chen

(57) ABSTRACT

In accordance with an embodiment of the present invention, a customer premises equipment (CPE) apparatus includes a first communications unit, a second communications unit, and a processing unit. The first communications unit is configured to receive an inbound message packet from a first communications channel. The inbound packet includes a destination address. The second communications unit is configured to send an outbound message packet on a second communications channel. The processing unit is configured to generate the outbound packet from the inbound packet where the outbound packet is modified to include a CPE device identifier if the destination address matches a predetermined registration server address. In one embodiment, this enables automatic CPE identification during subscriber registration process.

15 Claims, 6 Drawing Sheets

CPE IDENTIFICATION FLOW

METHOD OF IDENTIFYING A HOME GATEWAY USING NETWORK TRAFFIC SNIFFING AND APPARATUS EMPLOYING THE SAME

TECHNICAL FIELD

This invention relates generally to electronic communication over a network, and more particularly to an automated process of identifying a subscriber's customer premises equipment (CPE) associated with a service provider provisioning process.

BACKGROUND

As home networks become more sophisticated, service providers are looking to deploy and manage more intelligent devices in the subscriber's network. A number of services can be offered by such devices including Video on Demand (VoD), Voice over Internet Protocol (VoIP), Wireless-Fidelity (Wi-Fi) for a wireless Local Area Network (LAN), or a combination of services such as Wi-Fi VoIP. It is often desirable for service providers to offer service-branded Customer Premises Equipment (CPE) through traditional retail channels where the CPE requires a manual registration by a subscriber in order to create an account and activate service. An example of such service is a VONAGE™ branded LINKSYS® CPE for VoIP service.

During a traditional registration process, the service provider needs to associate the subscriber's account with a specific CPE in order to subsequently manage the CPE's configuration and service. Some service providers require the user to go through a manual process of entering a device identifier printed on the back of the device, for example, in order to identify the CPE. VONAGE® is one example of a service provider that requires this of their subscribers. However, this process is tedious and error-prone resulting in poor customer experiences and increased support costs when a subscriber encounters some difficulty with registration.

While some access networks allow a network service provider to identify the device through physical topology or interaction with a Dynamic Host Configuration Protocol (DHCP) interaction, this is not always possible. Independent service providers like VONAGE® do not provide the physical lines and may not be involved in providing Internet Protocol (IP) address assignments to such CPEs. This makes identifying the subscriber device even more difficult in these situations. Accordingly, there is a need in the art for a method and apparatus for use in identifying a subscriber's customer premises equipment (CPE) during registration without requiring manual entry of the CPE identification information or reliance upon indicators such as network topology or DHCP interaction.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Systems and methods are disclosed to enable a customer premises equipment (CPE) gateway router to automatically detect network traffic to a particular service provider and provide identification of the CPE to the service provider during a registration process. The term customer premises equipment (CPE) can refer generally to any equipment installed at a customer or subscriber's site such as a router, a modem, a computer, or other equipment. However, for this disclosure the term CPE refers to a router in particular and any switching network device in general. Further, a gateway CPE is a network device, such as a router, through which one or more network devices connect to higher levels of the network hierarchy. In this manner, network messages, or network traffic, must pass through the CPE when traversing the network hierarchy. Automated detection and device identification is useful beyond retail scenarios as well since service providers that ship a CPE to a customer may find it burdensome to track and monitor which specific CPE device is shipped to a particular customer. Self-registration and automated CPE identification allow these providers to employ more cost-effective distribution and inventory strategies.

Figure 1:
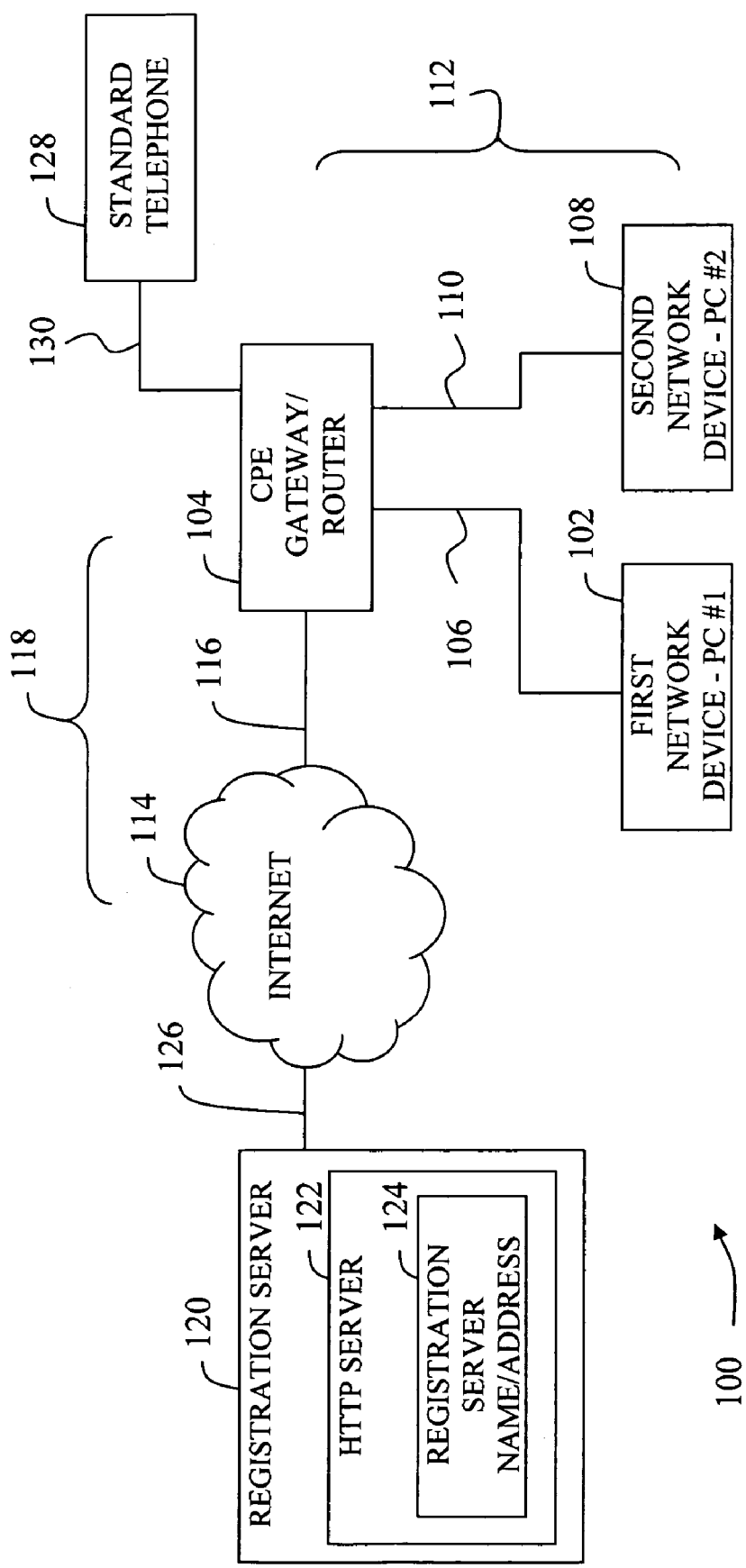
FIG. 1 shows a portion of a hierarchical network, in accordance with an embodiment of the invention.

In reference to FIG. 1, a portion of a hierarchical network 100 is shown including a first network device 102, such as a personal computer (PC), which can be connected to a CPE gateway router 104, henceforth CPE 104, through a first communications channel 106. Similarly, a second network device 108, such as a second PC, a printer, mass data storage system, or other network device, can be connected to CPE router 104 through a second communications channel 110. First network device 102, CPE 104, and second network device 108 comprise elements of an exemplary cluster with communication interconnections that comprise a local area network (LAN) at a first level of hierarchy. Communication channels (106, 110, and others) can include wired or wireless connections so that digital message information may be exchanged according to a communications protocol such as the Transfer Control Protocol/Internet Protocol (TCP/IP), or simply Internet Protocol (IP), on a hierarchical switched packet network. From the vantage point of any particular network device, a particular message packet may be considered inbound if it is received by the particular network device, or outbound if it is sent by the particular network device.

At a higher level of hierarchy, CPE 104 connects to Internet 114 via communications channel 116 so that all network traffic to and from first network device 102 and second network device 108 to Internet 114 passes through CPE 104 and communications channel 116. In this manner, CPE 104 functions as a gateway since it is connected to a wide area network (WAN) 118 and LAN 112 that has a comparatively narrow scope. In contrast to outbound traffic, which is traffic originating from any LAN device and sent in the direction of the Internet 114, upstream traffic enters CPE 104 from WAN 116. Further, downstream traffic leaves CPE onto LAN 112. A registration server 120, running a Hyper Text Transfer Protocol (HTTP) server 122 and having a registration server name/address 124, connects to Internet 114 via a communications channel 126. HTTP server 122 is only one embodiment of a server and protocol implementing registration server 120. Other server types and protocols may be used. Registration server name 124 can correspond to a particular IP address, as will be discussed below. The connections to and from Internet 114 are shown in abstract since other elements are typically necessary including modems, other routers, dynamic host configuration protocol (DHCP) servers, or other network devices at other hierarchical levels. Each network device node (102, 104, 108, and 120) operating on network 100 has an internet protocol (IP) address that is unique for the particular scope of the device within the network. That is, each node at the same level of hierarchy must have a unique network address to transfer data packets between the various nodes without conflicts. When crossing a level of hierarchy, a network address translator (NAT) may be employed to translate between WAN network addresses and LAN network addresses, for example. In one embodiment, a standard telephone 128 can interface with CPE 104 through a standard telephone cable 130 when CPE 104 includes Voice Over Internet Protocol (VoIP) capabilities. The use of an IP address as an identifier is not considered limiting since other protocols and identifiers may be used.

Figure 2:
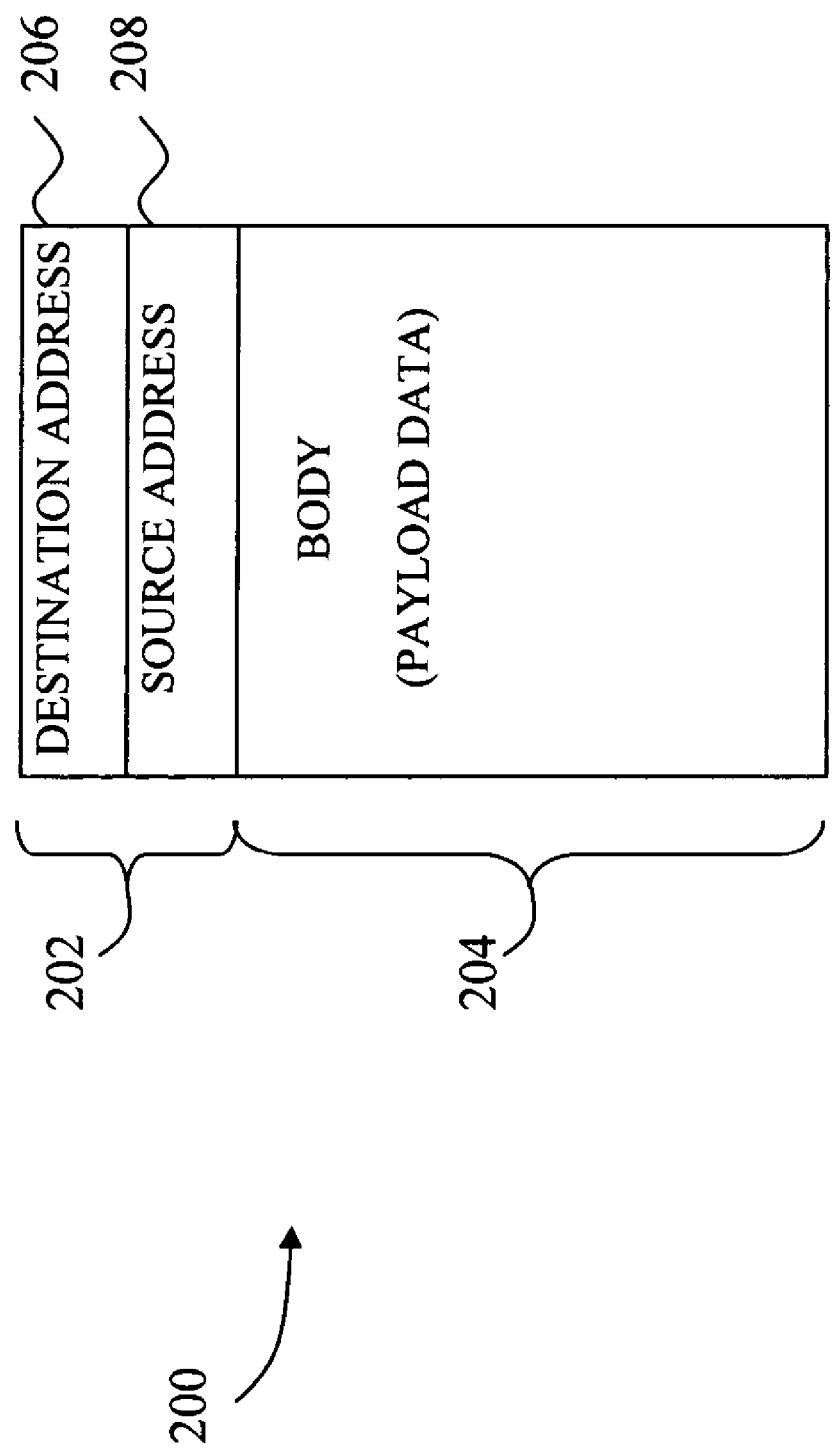
FIG. 2 shows a message packet, in accordance with an embodiment of the invention.

In reference to FIG. 2, information on a switched packet network travels in message packets 200 where each packet typically includes routing data 202 and payload data 204. Routing data 202 includes a destination IP address 206 and a source IP address 208 indicating the sender's IP address. In this discussion, packet 200 is presented in an abstract form since an actual message packet typically includes other data such as a packet number and coherency data, such as a cyclic redundancy check (CRC) value, to enable the destination to verify the entire content of packet 200 was received correctly. This address information is used to determine the routing of the packet through a switched packet network. A CPE 104 router can examine the address information for use in determining whether to forward a received packet and onto which communications channel. By examining the destination address, a router or switch can determine whether to pass along the received packet. More specifically, CPE 104 can examine the destination address and determine whether to pass the received packet from the LAN 112 to the WAN 118, or vice versa. Payload data 204 includes a portion of actual message data, such as a portion of an e-mail, an instant message, or a file, that is transferred from the sender's IP address to the intended receiver's IP address. A process of segmentation and reassembly is used to divide a block of information into numbered packets, and then reconstruct the block of information once the packets are received by the intended receiver.

In reference to FIGS. 1 and 2, a uniform resource locator (URL), such as used in HTTP, may be used to specify a particular world-wide-web (WWW) site address for a network resource such as registration server 120. In this case, a URL associated with the desired network resource may be entered into a web-browser application running on a personal computer 102 in order to access a particular network device in the hierarchical network or the Internet 114. A translation is necessary from the DNS name contained in the URL to a corresponding IP address. In this case, the URL is initially translated by a domain name server (DNS) that receives the URL information and replies with an IP address that becomes destination address 206. The domain name system, in accordance with TCP/IP, is a directory service that can be used to efficiently maintain mappings between names and internet address in a limited number of places in the internet, rather than at the location of each system. The IP address associated with the domain in the URL is stored within PC 102 for use in subsequent access to the network resource specified by the URL without referring to a DNS. Further, in protocols such as HTTP, some components of the URL are also transmitted as the payload 204 of packet 200. In typical use of HTTP, the target domain name is communicated using the "Host" header attribute and the resource path is communicated using "Request-URI" field. Additionally, the device originating the packet using HTTP may include other identifying information such as a cookie previously set by the HTTP server. The HTTP "Cookie" and "Cookie2" header attributes can be used for this purpose.

Figure 3:
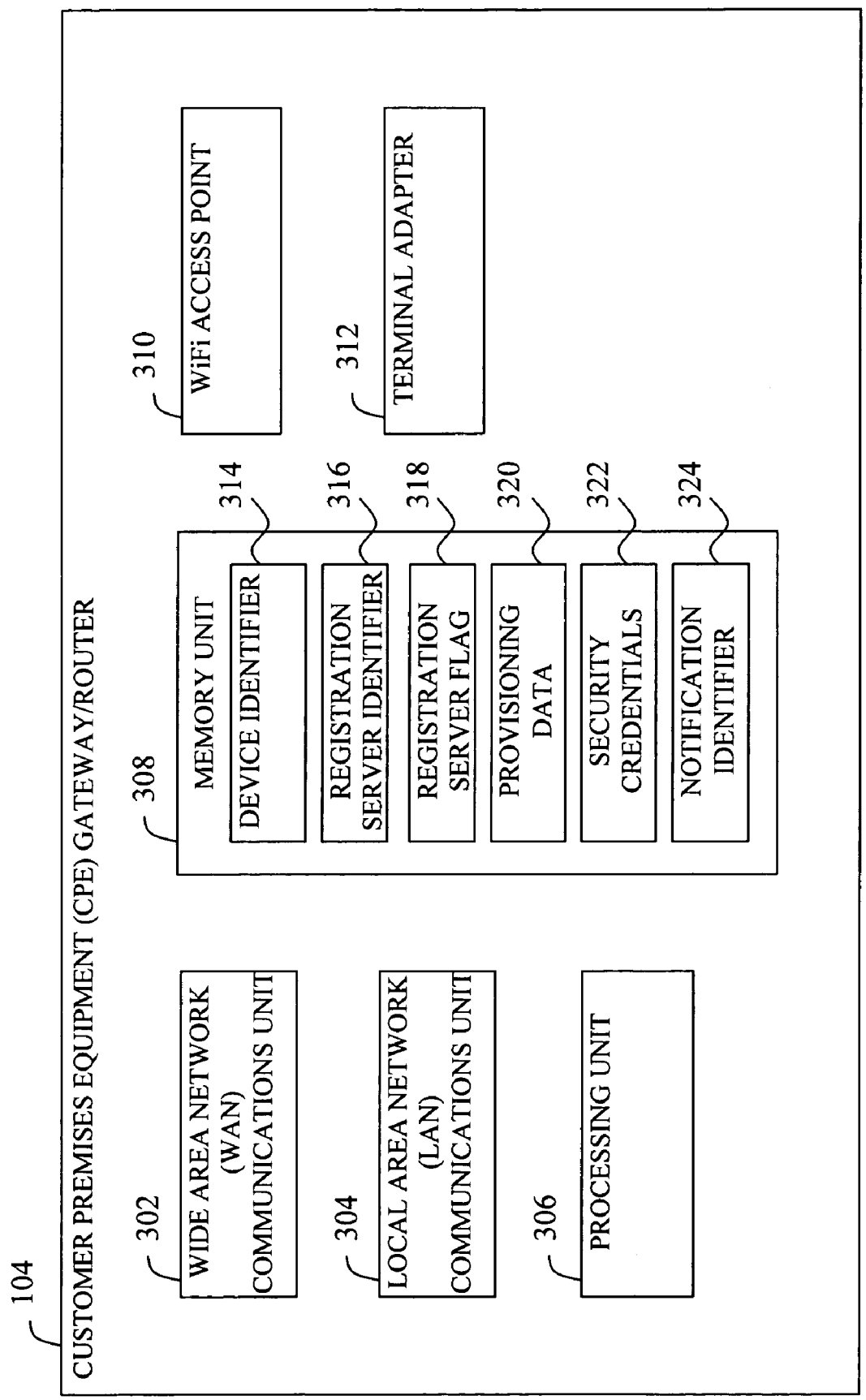
FIG. 3 shows a block diagram of a customer premises equipment (CPE) gateway router, in accordance with an embodiment of the invention.

FIG. 3 shows a block diagram of CPE gateway router 104 including a wide area network (WAN) communications unit 302 for sending and receiving messages on WAN 118, a local area network (LAN) communications unit 304 for sending and receiving messages on the LAN 112, a processing unit 306 for executing a stored program in order to direct received messages to either LAN 112 or WAN 118, and a memory unit 308 for storing and retrieving information used in the processing of messages. In one embodiment, CPE 104 can include a wireless fidelity (WiFi) access point unit 310 for providing wireless access to CPE 104 on a wireless local area network (WLAN). In another embodiment, CPE 104 can include a terminal adapter 312 for interfacing with a non-network device such as telephone 128, as shown in FIG. 1. In this manner, terminal adapter 312 can be configured during a provisioning process to provide network access to a non-network communications device connected to CPE 104, such as a standard telephone for use in VoIP applications.

Memory unit 308 can store and retrieve information including a unique CPE device identifier 314, one or more registration server identifiers 316, and one or more registration server flags 318. While DNS names are used in one embodiment as the registration server identifier 316, other identifying information may be used. Prior to the provisioning of service from a service provider, using DNS names is preferable to using hard-coded IP addresses for registration server identifier 316 because the actual IP address may change for a particular server. If a DNS name is used for registration server identifier 316, a names server can be used to contemporaneously translate the DNS name to the currently assigned IP address. The translation of a DNS name to a current IP address is discussed in reference to FIG. 5 below.

Device identifier 314 is unique identifying information that is resident on CPE 104 and can include a serial number, a Media Access Control (MAC) address, a manufacturer name, a model name/number, and a firmware revision level to completely identify CPE 104 to registration server 120. Other information may be stored, retrieved, and used to uniquely identify a particular CPE device including a resource name, which is a part of a URL that follows the DNS name and port. Further, when the registration server is implemented using a HTTP server as discussed in reference to FIG. 1, a HTTP cookie name, value, or any other arbitrary payload attribute may be used for matching the CPE registration request and for identifying the CPE or the registration flow (e.g. session cookie) to the registration server. Briefly, in reference to FIG. 2, a typical IP packet header provides a source IP address 206 and destination IP address 208. However, in a typical payload section 204 containing HTTP data, a TCP packet header provides a source port and a destination port along with the HTTP data. The destination port could be used in addition to registration server identifier to match the registration request packet from the DPE.

In one embodiment, each server identifier 316 corresponds to a DNS name of a particular Internet resource such as a web-server corresponding to registration server name/address 124 as shown in FIG. 1. Each registration server flag 318 corresponds to a particular registration server identifier 316 and indicates whether CPE device identifier 314 was previously registered with the particular registration server, such as registration server 120. Any or all of the registration server flags 318 may be set or cleared under control of the processing unit 306. Memory unit 308 can also store and retrieve CPE provisioning data 320, security credentials 322, and a notification identifier 324. CPE provisioning data 320 is used in the setup and configuration data for use in establishing and validating service with one or more network services, such as a VoIP service provider, or a media subscription service such as video-on-demand. The configuration data can typically be manipulated by the service provider systems, but in order to load configuration data specific to a given subscriber, the CPE must first be identified by service provider as belonging to a given registered subscriber. According to this invention, subscriber's CPE is automatically identified during subscriber registration process. Security credentials 322 can include data, such as signatures or encryption keys, used to mutually identify the CPE and the registration server to each other to avoid fraud and misuse or to establish secure communications to safeguard customer data. Finally, notification identifier 324 can include information used in a separate message packet containing device identifier 314 information sent by CPE 104 to the registration server.

Figure 4:
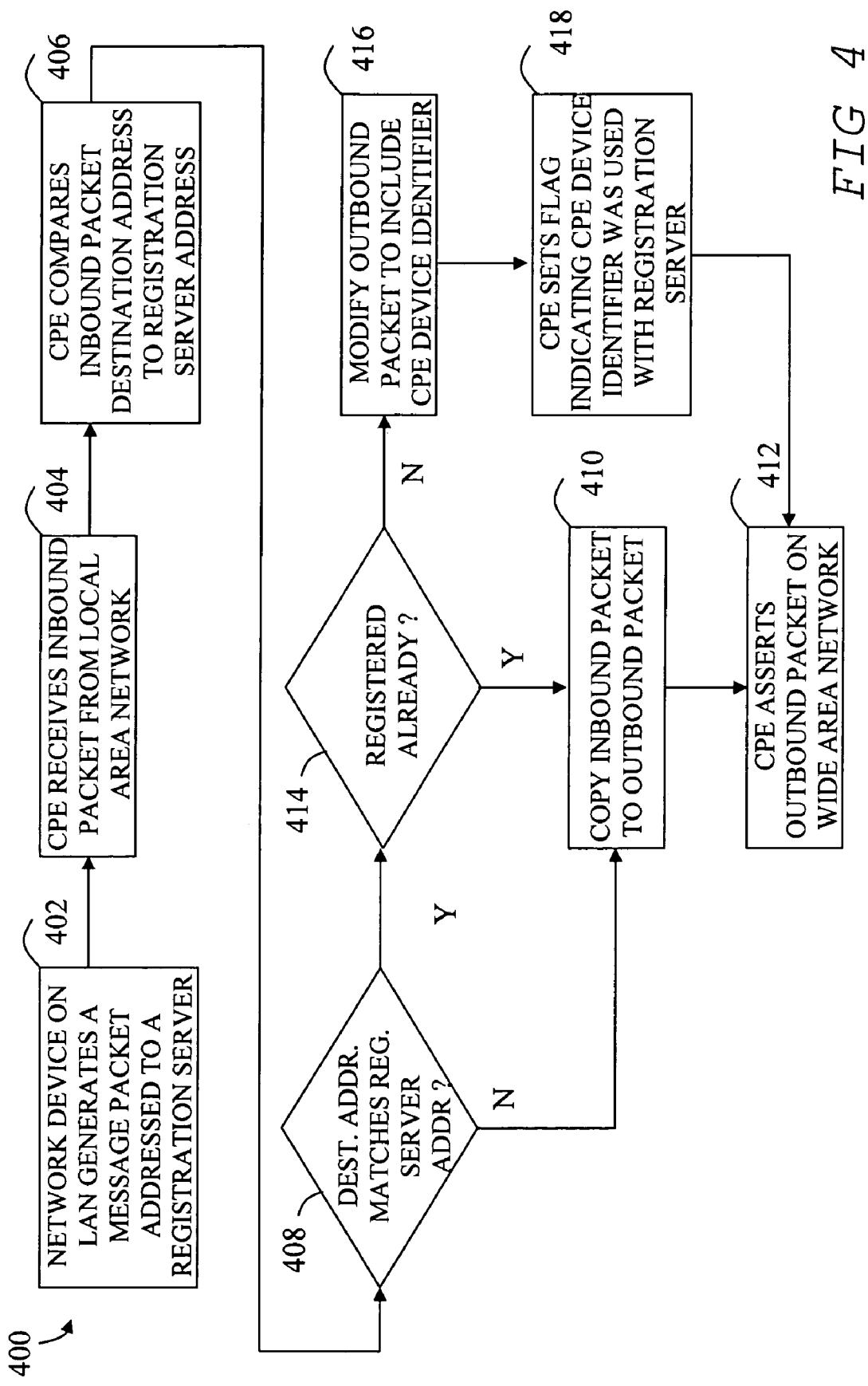
FIG. 4 shows a diagram illustrating a CPE identification flow, in accordance with an embodiment of the invention.

FIG. 4 shows a diagram illustrating a CPE identification flow 400 where a gateway CPE device provides identification information to registration server 120 by examining network traffic comprising upstream message packets. In this manner, a home gateway (CPE) performs "sniffing" by examining the destination domain name, resource name or other identifying information address of inbound message packets and notifies the registration server about device identity 314. The notification can be accomplished using a variety of ways. The CPE 104 may insert identifying information of the home gateway CPE into the packet for use in a provisioning process. In this case, an existing packet is changed to include CPE device identifier 314, as shown in FIG. 3. Alternatively, CPE 104 may establish a separate connection to the registration server using notification identifier 324, such as a notification URL, and notify the registration server regarding the CPE device identity to that host, as shown in FIG. 3. In case of latter embodiment, the CPE 104 would also identify the session corresponding to the original flow. This can be accomplished using a session cookie or other session identifier.

In reference to FIGS. 1-4, flow 400 begins by PC 102 generating a message packet 200 addressed to registration server 120 in operation 402. In one embodiment, this process may be triggered by customer initiating subscriber registration process with the service provider via a web browser on PC 102. In this case, PC 102 can generate message packet 200 as a part of gaining access to, or providing information to, registration server 120. To initiate this process of communication between PC 102 and registration server 120, a user can enter a uniform resource locator (URL), or web-address associated with registration server 120, into an address field for a web-browser application running on PC 102. Alternatively, a user could be already accessing a web-page and could select (click on) a hyper-link to registration server 120. In both cases, the web-browser could generate one or more upstream message packets 200 onto communications channel 106 associated with LAN 112, where the message packet has the network device identified by the URL as an ultimate destination. In a routed network like the Internet 114, a message packet may traverse several layers of hierarchy in this process where a routing device, such as CPE 104, may receive an inbound packet and conditionally send an outbound packet on communications channel 116 based on the packet destination address and current routing information. Once access to registration server 120 is initiated, flow 400 continues with an operation 404 where CPE receives an inbound packet from LAN 112, such as a packet generated by PC 102 onto communications channel 106, upon initiating access to registration server 120.

Once the inbound packet is detected from LAN 112, flow 400 continues with comparing the destination address 206 of the inbound packet with registration server identifier (address) 316 in operation 406. More specifically, in operation 406 processing unit 306 extracts the destination address 206 from the inbound packet and compares it with the stored registration server identifier 316, and control moves to operation 408. If destination address 206 does not match registration server identifier 316, then the result of the comparison in operation 408 is "N", and control moves to operation 410. In operation 410, CPE 104 copies the unmodified inbound packet received by the LAN communications unit 304 as an outbound packet for sending by the WAN communications unit 306, and control moves to operation 412. In operation 412, the outbound packet is asserted onto communications channel 116. However, in operation 408, if destination address 206 does match registration server identifier 316, then the result of the comparison in operation 408 is "Y" and control moves to operation 414.

In operation 414, CPE 104 examines the associated registration server flag 318 to determine whether CPE 104 has previously accessed registration server 120. More specifically, processing unit 306 retrieves the value of registration server flag 318 from memory unit 308 and evaluates whether this value indicates CPE 104 was previously sent to registration server 120. The value of registration server flag 318 stored in memory unit 308 can carry one of two values: true or false, to convey the status of whether registration server identifier 316 was used with the corresponding registration server.

Many registration server identifier 316 and registration server flag 318 pair values may be stored in memory unit 308, where each pair corresponds to a different registration server 120. The values stored in memory 308 may be changed under control of processing unit 306 in order to change registration server identifier 316 and registration server flag 318 values. For example, the address value stored for registration server 120 in registration server identifier 316 may change to correspond with a new service provider, a changed address for an existing service provider, or to adapt to changing network address assignments, for example. Similarly, registration server flags 318 may be changed from set to reset in order to allow a re-registration process for a previously registered CPE 104, for example. Registration server flags 318 may be changed from reset to set in order to disable a registration process for a currently un-registered CPE 104, for example.

If CPE 104 device identifier 314 was previously sent to registration server 120, then the result of the comparison in operation 414 is "Y" and control moves to operation 410. However, if CPE 104 device identifier 314 was not previously sent to registration server 120, then the result of the comparison in operation 414 is "N" and control moves to operation 416 where CPE 104 inserts CPE device identifier 314 into an outbound message packet. Alternatively, an optional step of matching payload attributes with pre-provisioned data stored in the CPE such as a resource name and/or cookie values may be executed after operation 414 and before operation 416. In one embodiment, inserting CPE device identifier 314 into the outbound message packet includes copying the payload data 204 from the inbound packet to the outbound packet and adding device identifier 314. In this manner, the payload data of the inbound packet differs from the payload data of the outbound packet only by the addition of device identifier 314. Stated differently, the data portion of the outbound packet is identical with the data portion of the inbound packet except for the addition to the outbound packet of device identifier 314. Once device identifier 314 is inserted into the outbound packet in operation 416, control moves to operation 418 where CPE 104 sets the associated registration server flag 318 indicating CPE 104 has used device identifier 314 with registration server 120. Finally, once registration server flag 318 is set, control moves to operation 412 where the modified outbound packet is asserted onto outbound communications channel 116 associated with WAN 118.

Figure 5:
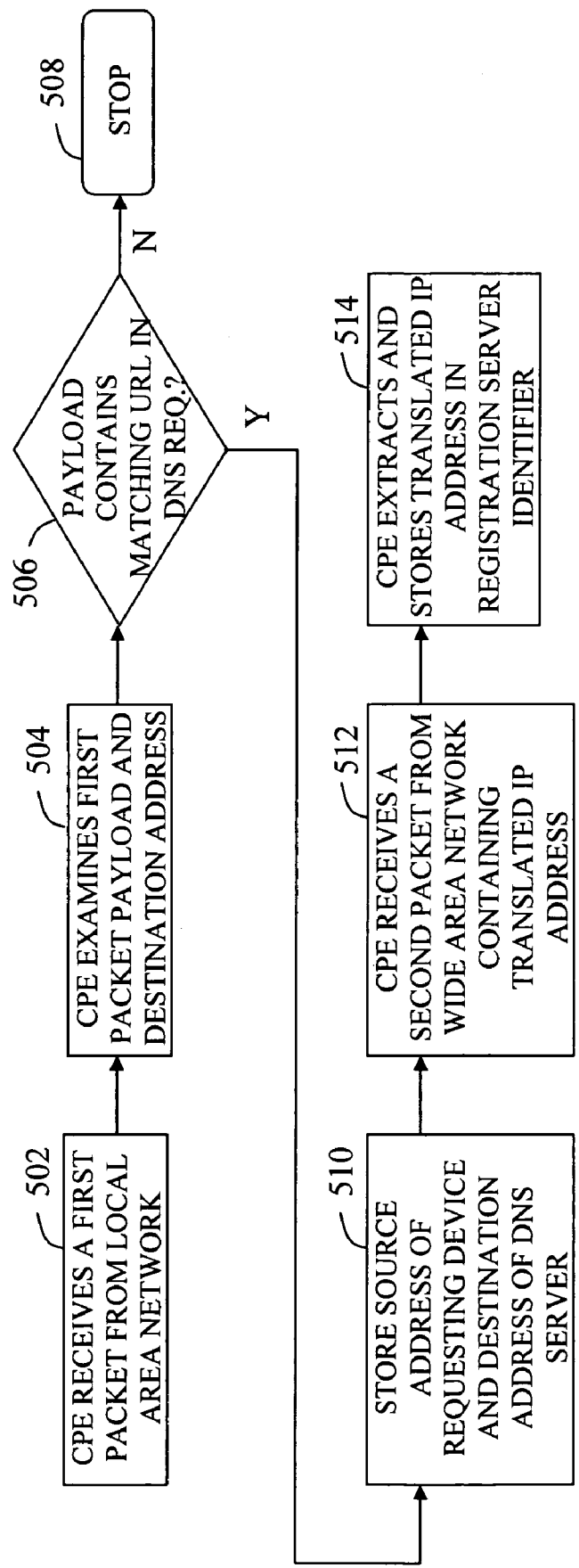
FIG. 5 shows a DNS name to IP address resolution flow, in accordance with an embodiment of the invention.

FIG. 5 shows a DNS name to IP address resolution flow 500. The flow 500 begins with operation 502 where the CPE receives a first packet from the local area network, and control moves to operation 504. After receiving the first packet, the CPE examines the payload and destination address of the first packet in operation 504 to detect a translation (GET) request from a DNS server for a particular DNS name that may have been derived from a URL address. As described herein, the domain name server (DNS) typically resolves domain names from uniform resource locators (URLs) into Internet Protocol (IP) addresses. In this case, the request from the DNS server is a request for translation of a particular URL to the current IP address associated with the URL stored in the domain names server. After receiving and examining the first packet, control moves to operation 506 where the CPE determines whether the particular URL in the payload DNS request matches a stored registration server identifier 316 in memory unit 308. If the payload of the received packet does not contain a matching URL in the DNS request, the result of the comparison is "N" and control moves to operation 508 where flow 500 stops. However, if the result of the comparison in operation 506 is "Y", control moves to operation 510 where the CPE stores the first packet source address of the requesting network device on the local LAN and the destination address for the DNS server. Flow 500 then waits until the CPE detects receipt of a second packet from WAN 118 with a source address corresponding to the DNS server address and a destination address corresponding to the requesting network device in operation 512 and containing a translated (or resolved) IP address corresponding to the submitted URL. Control them moves to operation 514 where the CPE 104 then stores the resolved IP address in memory unit 308 in a location associated with the corresponding registration server identifier 316, after which flow 500 is ended.

As an alternative to flow 500, CPE 104 can examine (sniff) the payload of a received packet from the LAN to determine a request was generated on a standard DNS port-53 and store the resolved IP address received in a subsequently received packet, as described above. Because a TCP/IP system can typically support multiple independent processes, a port represents a data structure used to uniquely identify each application running in the system. In yet another alternative, CPE 104 can separately initiate a URL to IP address resolution request for each of the unused registration server identifiers 316 as determined by the state of the corresponding registration server flag 318. In this case, the corresponding registration server flag 318 would include additional information to convey the status including whether the corresponding registration server identifier 316 has been resolved to a contemporaneous IP address, as described above. The separately initiated URL to IP address resolution request may be generated periodically in order to ensure a current IP address is stored for use in self-registration. A response from a DNS name server from a prior translation request may also include an expiration after which the stored IP address would need to be refreshed. The DNS name to IP address resolution flow 500 was accomplished at some time prior to CPE identification flow 400 since, according to at least one embodiment, flow 400 compares the inbound packet destination address to the registration server address in operation 406.

Figure 6:
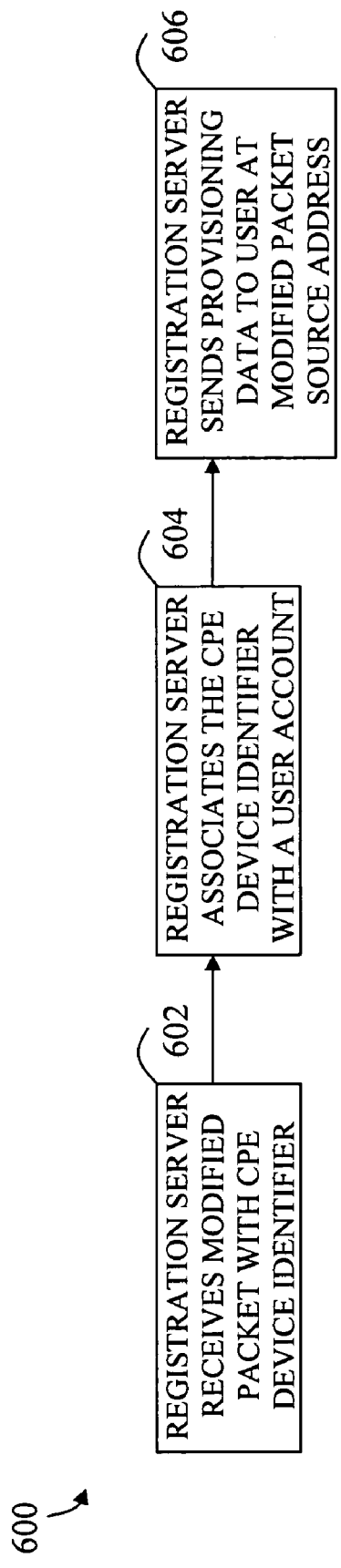
FIG. 6 shows a diagram illustrating a user account association flow, in accordance with an embodiment of the invention.

FIG. 6 shows a diagram illustrating a user account association flow 600 where a CPE device identifier is used to associate a user account with a specific CPE device. In this manner, a service provider may efficiently manage the configuration and service of the specific CPE device. In reference to FIGS. 1-6, flow 600 begins by registration server 120 receiving the modified outbound packet 200 including CPE device identifier 314, in operation 602. Once the modified packet is received, control moves to operation 604 where registration server 120 associates a specific CPE 104 identified by CPE device identifier 314 with a particular user account. Once the association is made between the specific CPE 104 and the user account, control moves to operation 606 where registration server 120 sends provisioning data to PC 102 identified by source address 208 in the modified packet 200. The above is only description of a possible user account association flow once the CPE is identified to a registration server, and is not considered limiting.

Although the invention has been described with respect to particular embodiments, this description is only an example of the invention's application and should not be taken as a limitation. Consequently, the scope of the invention is set forth in the following claims.

We claim:

1. A customer premises equipment (CPE) apparatus, comprising:
   a first communications unit configured to receive an inbound message packet from a first communications channel, the inbound packet including a destination address;
   a second communications unit configured to send an outbound message packet on a second communications channel;
   a processing unit configured to generate the outbound packet from the inbound packet, the outbound packet being modified to include a CPE device identifier if the destination address matches a predetermined registration server address; and
   a memory unit configured to store a registration server flag value configured to indicate whether the CPE device identifier was sent in a previous outbound packet to the registration server, the outbound packet being modified to include a CPE device identifier if the registration server flag value indicates the CPE device identifier was not previously sent.

2. The CPE apparatus of claim 1, wherein the first communications channel is different from the second communications channel.

3. The CPE apparatus of claim 1, further comprising:
   a wireless fidelity (WiFi) access point configured to provide wireless local area network (LAN) access to the CPE.

4. The CPE apparatus of claim 1, further comprising:
   a terminal adapter configured to provide network access to a non-network communications device.

5. The CPE apparatus of claim 4, wherein the non-network communication device is a telephone.

6. The CPE apparatus of claim 5, wherein the CPE device identifier is sent to the registration server as a part of a voice over internet protocol (VoIP) provisioning process.

7. The CPE apparatus of claim 1, wherein the memory unit stores security credentials adapted for use in establishing and validating service with one or more network services.

8. A customer premises equipment (CPE) apparatus, comprising:
   means for receiving an inbound message packet from a first communications channel, the inbound packet including a destination address;
   means for sending an outbound message packet on a second communications channel;
   means for generating the outbound packet from the inbound packet, the outbound packet being modified to include a CPE device identifier if the destination address matches a predetermined registration server address; and
   a memory means for storing and retrieving information including the device identifier, the registration server address, and a registration server flag associated with the registration server address,
   wherein the registration server flag has a value that indicates whether the CPE device identifier was sent in a previous outbound packet to the registration server, the outbound packet being modified to include a CPE device identifier if the registration server flag value indicates the destination address did not match the registration server address for a previously sent outbound packet.

9. The CPE apparatus of claim 8, wherein the CPE device identifier is sent to the registration server as a part of a service provider provisioning process.

10. The CPE apparatus of claim 9, wherein the CPE device receives provisioning data associated with the CPE device identifier.

11. A method of providing identifying information from a first network device to second network device, the method comprising the operations of:
   receiving an inbound message packet from a first communications channel, the inbound packet including a destination address;
   generating an outbound message packet based on the inbound packet;
   comparing the destination address to a predetermined registration server address;
   modifying the outbound message to include a CPE device identifier if the destination address matches the predetermined registration server address, wherein the CPE device identifier is sent to the registration server as a part of a service provider provisioning process;
   sending the modified outbound message on a second communications channel; and
   setting a registration server flag corresponding to the registration server address, the registration server flag indicating whether the CPE device identifier was previously sent to the registration server.

12. The method of claim 11, wherein a data portion of the outbound packet is identical with a data portion of the inbound packet except for the addition to the outbound packet of the CPE device identifier.

13. The method of claim 11, further comprising:
   receiving the modified packet including the CPE device identifier;
   associating the CPE device with a predetermined user account; and
   sending provisioning data to the CPE device at a modified packet source address.

14. The method of claim 11, further comprising:
   receiving a first message packet from a first communications channel, the first packet including a first source address, a first destination address, and a first data payload;
   examining the first data payload to determine if it includes a request for translation of a first URL;
   examining a second URL associated with a predetermined registration server; and
   storing the first source address and first destination address when the first URL matches the second URL.

15. The method of claim 14, further comprising:
   receiving a second message packet from a second communications channel, the second packet including a second source address matching the first destination address, a second destination address matching the first source address, and a second data payload containing a translated IP address corresponding to the first URL;
   extracting the translated IP address; and
   storing the translated IP address as the predetermined registration server address.

* * * * *